(12) United States Patent
Minamino et al.

(10) Patent No.: US 7,038,993 B2
(45) Date of Patent: May 2, 2006

(54) OPTICAL DISC MEDIUM HAVING A PLURALITY OF SECTOR GROUPS, A RECORDING METHOD THEREOF AND RECORDER

(75) Inventors: Junichi Minamino, Nara (JP); Hiromichi Ishibashi, Ibaraki (JP); Yoshiharu Kobayashi, Katano (JP); Atsushi Nakamura, Kadoma (JP); Takashi Ishida, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 437 days.

(21) Appl. No.: 10/148,603

(22) PCT Filed: Nov. 29, 2000

(86) PCT No.: PCT/JP00/08460

§ 371 (c)(1),
(2), (4) Date: May 30, 2002

(87) PCT Pub. No.: WO01/41139

PCT Pub. Date: Jun. 7, 2001

(65) Prior Publication Data
US 2002/0191521 A1 Dec. 19, 2002

(30) Foreign Application Priority Data
Dec. 2, 1999 (JP) ................................. 11-343060

(51) Int. Cl.
*G11B 5/09* (2006.01)
(52) U.S. Cl. .................................. 369/59.25
(58) Field of Classification Search .......... 369/275.3, 369/275.4, 59.25, 59.26, 47.31, 47.14; 714/14
See application file for complete search history.

(56) References Cited

U.S. PATENT DOCUMENTS

| 4,660,100 | A | * | 4/1987 | Sugiyama et al. ........... 386/124 |
| 5,418,773 | A | | 5/1995 | Bakx et al. |
| 5,720,030 | A | * | 2/1998 | Kamihara et al. ............. 714/42 |
| 5,737,145 | A | | 4/1998 | Jung |
| 5,745,457 | A | * | 4/1998 | Hayashi et al. .......... 369/47.45 |
| 5,754,506 | A | * | 5/1998 | Nagasawa et al. ........ 369/44.26 |
| 5,805,564 | A | * | 9/1998 | Kobayashi et al. ....... 369/275.3 |
| 5,862,112 | A | | 1/1999 | Nagai et al. |
| 5,872,767 | A | | 2/1999 | Nagai et al. |
| 5,914,928 | A | * | 6/1999 | Takahashi ................ 369/47.14 |
| 5,933,410 | A | * | 8/1999 | Nakane et al. ........... 369/275.3 |
| 6,049,515 | A | * | 4/2000 | Yamamuro ................ 369/47.14 |
| 6,075,761 | A | | 6/2000 | Akiyama et al. |
| 6,078,559 | A | * | 6/2000 | Takemura et al. ....... 369/275.3 |
| 6,181,657 | B1 | | 1/2001 | Kuroda et al. |
| 6,282,166 | B1 | | 8/2001 | Akiyama et al. |
| 6,298,033 | B1 | * | 10/2001 | Tanoue et al. ........... 369/275.3 |
| 6,310,847 | B1 | | 10/2001 | Kuroda et al. |

(Continued)

FOREIGN PATENT DOCUMENTS

JP 63-013170 A 1/1988

(Continued)

*Primary Examiner*—Tianjie Chen
(74) *Attorney, Agent, or Firm*—Akin Gump Strauss Hauer & Feld, LLP

(57) ABSTRACT

An optical disc medium, including a plurality of sector groups each being made up of multiple contiguous sectors on a track, is provided. In this optical disc medium, the location information of each of those sector groups is divided into a predetermined number of information pieces and distributed to associated sectors on the same track.

30 Claims, 13 Drawing Sheets

U.S. PATENT DOCUMENTS

| | | | |
|---|---|---|---|
| 6,396,798 B1 * | 5/2002 | Takemura et al. | 369/275.3 |
| 6,459,667 B1 * | 10/2002 | Iijima et al. | 369/47.31 |
| 6,487,151 B1 * | 11/2002 | Nagata et al. | 369/47.51 |
| 6,552,983 B1 * | 4/2003 | Yoshida et al. | 369/53.12 |
| 6,751,178 B1 * | 6/2004 | Lee et al. | 369/59.25 |
| 6,775,220 B1 * | 8/2004 | Yoshimoto et al. | 369/59.25 |

FOREIGN PATENT DOCUMENTS

| | | |
|---|---|---|
| JP | 63-086160 A | 4/1988 |
| JP | 07-153191 A | 5/1995 |
| JP | 08-293162 A | 11/1996 |
| JP | 09-223362 A | 8/1997 |

* cited by examiner

← GROOVE PORTION
← INTER-GROOVE PORTION

← GROOVE PORTION
← INTER-GROOVE PORTION

← GROOVE PORTION
← INTER-GROOVE PORTION

← GROOVE PORTION
← INTER-GROOVE PORTION

OPTICAL DISC MEDIUM HAVING A PLURALITY OF SECTOR GROUPS, A RECORDING METHOD THEREOF AND RECORDER

TECHNICAL FIELD

The present invention relates to a rewritable optical disc medium and also relates to a recording method and recorder thereof.

BACKGROUND ART

In recent years, the optical disc has been used more and more extensively to store video information thereon. Thus, to record a video of even better quality thereon for a longer time, further increase in recording density and read/write speeds thereof is strongly demanded. To achieve this purpose, it is naturally effective to develop a novel storage medium on which information can be stored at an even higher density. However, it is equally important and pressing as well to reduce a so-called "overhead area" (e.g., address area), not contributing to increase in the capacity of information to be stored, as much as possible.

FIG. 13 illustrates a format for an information track on a conventional optical disc. In FIG. 13, the reference numeral 1501 denotes a sector as an information unit, the reference numeral 1502 denotes a non-rewritable header field recorded in the shape of pits while the optical disc is manufactured, and the reference numeral 1503 denotes a recording field on which information can be written.

In the conventional optical disc, each track has a format in which a number of sectors 1501 are arranged in line as minimum read/write units. Each of these sectors 1501 consists of a header field 1502 having a length of 128 bytes and a recording field 1503 having a length of 2,569 bytes.

Although not shown in FIG. 13, the recording field includes a VFO (variable frequency oscillator) field, a data field on which user data is written, and a buffer field as a redundancy area. The VFO field is provided to accomplish a phase lock on a PLL (phase-locked loop), which is needed for reading out a signal recorded.

In the conventional optical disc, to specify what sector on what part of the disc a light beam spot is now following, each header field 1502 includes location information (i.e., address information representing a specific location on the optical disc). The location information stored on the header field 1502 indicates the location information of the sector 1501 including the header field. More specifically, as shown in FIG. 13, location information "123456" has been recorded on the header field of the sector 1501 specified by an address "123456". This location information has a length of 4 bytes. An error detection code of 2 bytes is added to the 4-byte location information to see if the location information has been read out correctly.

A signal representing the location information is recorded at the same density as the data to be written on the recording field. Accordingly, the signal, as well as the data, needs to be read out using a PLL. For this purpose, a VFO field is also provided for the header. When an optical disc is used as a peripheral storage device for a computer, the information stored on the optical disc should be much more reliable as compared to a situation where the same optical disc is used to record or replay video or music on/from it. Thus, to consolidate the reliability, the same location information is recorded four times on a single header. As a result, the location information per header has a total length of 128 bytes.

As described above, in the conventional optical disc, each sector has to store the same location information thereon physically four times and also needs a so-called "overhead area" such as a VFO field. Accordingly, the storage capacity of the optical disc decreases correspondingly.

In order to overcome the problems described above, the present invention was made and its object is to provide an optical disc that includes a smallest possible overhead area and can be used effectively to store video or any other type of information thereon, and an optical disc drive for such a disc.

DISCLOSURE OF INVENTION

An optical disc medium according to the present invention includes a plurality of sector groups, each being made up of multiple sectors that are contiguous with each other in a circumferential direction on a track. In at least some of the sector groups, the location information thereof is divided into multiple pieces of information and distributed to associated ones of the sectors on the same track.

The location information is preferably represented by a plurality of identification marks that are formed as embossed pits. Also, each said embossed pit is preferably formed between recording fields of associated ones of the sectors that are adjacent to each other in the circumferential direction on the track.

In a preferred embodiment, each said sector group is made up of 32 contiguous sectors.

In another preferred embodiment, each said identification mark assumes one of three mutually different states and represents synchronization information or one-bit information of 1 or 0 by any of the three different states.

In another preferred embodiment, each said identification mark is provided within a header gap that has a length of 200T or less in a direction in which the track extends, where T is a distance that a light beam goes in one reference clock period.

In another preferred embodiment, each said identification mark is made up of at most two of the embossed pits. The identification marks may be arranged on a centerline of the track on which information is recorded. Alternatively, the identification marks may also be arranged so as to be shifted by a half track pitch from the centerline of the track.

In another preferred embodiment, the optical disc medium has a recording plane that is divided into a plurality of band-like zones arranged concentrically around the center of the disc medium. Multiple tracks are included in each said zone. The number of sectors included in each said track changes on a zone-by-zone basis. The number of sectors included in each said zone is a multiple of the number of sectors that makes up each said sector group.

In another preferred embodiment, the location information of an arbitrary one of the sector groups is distributed to multiple sectors included in the sector group.

In another preferred embodiment, the optical disc medium includes a non-usable dummy sector, and the identification mark included in the dummy sector is provided with invalidity information that makes the sector identifiable as the dummy sector. The invalidity information is preferably identical with the synchronization information.

In another preferred embodiment, the number of sectors that makes up each said sector group is a multiple of the number of sectors that makes up a sector block on which logical processing is performed. The sector located at the top of each said sector group is preferably identical with the sector located at the top of one of the sector blocks on which the logical processing is performed. The logical processing may be either error correction processing or interleaving processing. Replacement processing is preferably performed on a sector group basis.

In another preferred embodiment, each said sector has its location information recorded thereon.

In another preferred embodiment, the optical disc medium has a recording plane that is divided into a plurality of band-like zones arranged concentrically around the center of the disc medium. Multiple tracks are included in each said zone. The number of sectors included in each said track changes on a zone-by-zone basis. In at least one of the zones, the number of sectors that makes up the zone is not a multiple of the number of sectors that makes up each said sector group. In that case, the sectors that make up the zone may include a remainder sector that does not belong to any of the sector groups, and the identification mark of the remainder sector may be provided with information that makes the sector identifiable as the remainder sector. No information is preferably recorded on the recording field of the remainder sector.

An optical disc recording method according to the present invention is a method for performing recording on the optical disc medium according to any of the preferred embodiments described above. In this method, the replacement processing is performed on a sector group basis.

Another optical disc recording method according to the present invention is a method for recording information on the optical disc medium according to any of the preferred embodiments described above. In this method, each said sector has its own location information recorded thereon.

Still another optical disc recording method according to the present invention is a method for recording information on the optical disc medium including the remainder sector. In this method, the information is not recorded on the recording field of the remainder sector.

Yet another optical disc recording method according to the present invention is a method for recording information on the optical disc medium including the remainder sector. In this method, an invalidity signal is recorded on the remainder sector.

An optical disc recorder according to the present invention is a recorder for performing recording on the optical disc medium according to any of the preferred embodiments described above. In this recorder, each said sector has its own location information recorded thereon.

Another optical disc recorder according to the present invention is a recorder for recording information on the optical disc medium including the remainder sector. In this recorder, the information is not recorded on the recording field of the remainder sector. An invalidity signal that makes the sector identifiable as the remainder sector is preferably recorded on the recording field of the remainder sector. Alternatively, the invalidity signal may also be recorded on the remainder sector.

BEST MODE FOR CARRYING OUT THE INVENTION

Hereinafter, preferred embodiments of the present invention will be described with reference to the accompanying drawings.

Figure 1A:
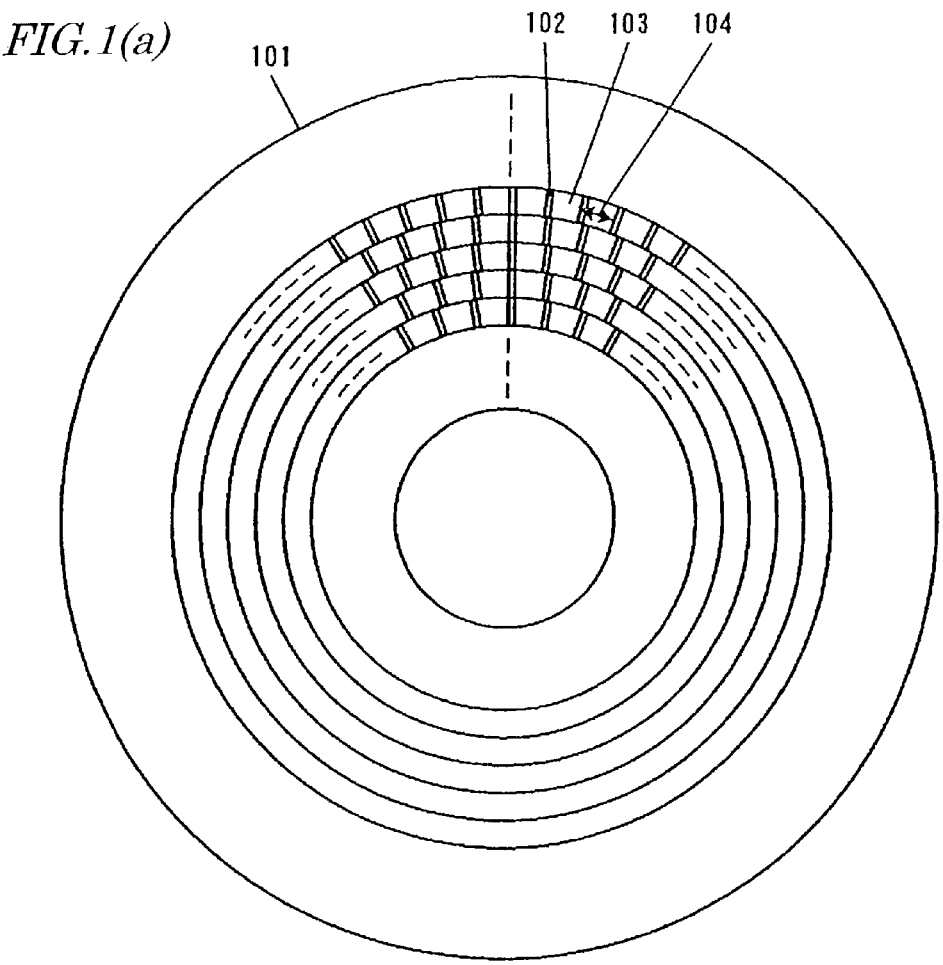
FIG. 1 illustrates a format for an optical disc according to the present invention.
Figure 1B:
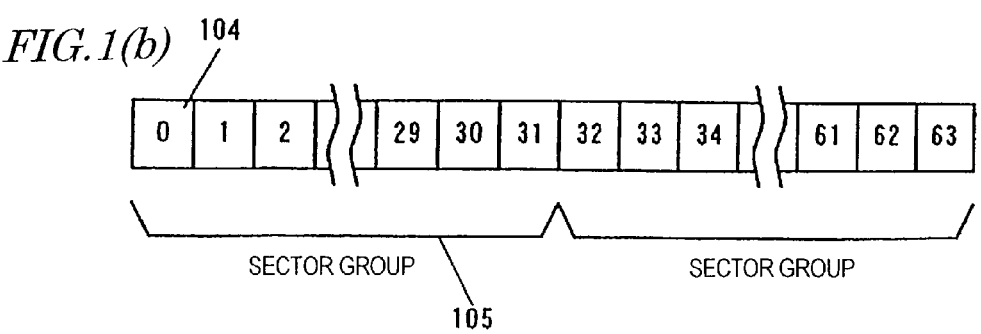

FIG. 1(a) illustrates a first embodiment of an optical disc according to the present invention. As shown in FIG. 1(a), an optical disc substrate 101 according to this embodiment is a disklike plate, on the recording plane of which multiple information tracks (which will be herein referred to as "tracks") have been formed. Each of these tracks is made up of a plurality of sectors 104, each including a header field 102 and a recording field 103. The header field 102 is made up of embossed pits (pre-pits) that were formed while the disc was being manufactured. The arrangement of these pits represents non-rewritable information. On the other hand, the recording field 103 is an area on which information can be written and rewritten. As shown in FIG. 1(b), the optical disc substrate 101 of this embodiment includes a plurality of sector groups 105, each being made up of a predetermined number of (e.g., 32 in this embodiment) sectors.

A state in which a number of tracks are arranged concentrically is illustrated in FIG. 1(a) for the sake of simplicity. Actually, though, the tracks are arranged spirally in this embodiment.

The optical disc substrate 101 includes a phase change type recording film that changes from an amorphous state into a crystalline state, or vice versa, when exposed to laser radiation. Thus, information can be written on, or erased from, the recording film. The information is read based on a difference in the intensity of the light that has been reflected from respective parts of the optical disc (i.e., based on a difference in reflectance of respective parts of the recording film).

In this embodiment, the revolution of the optical disc substrate 101 is controlled by a ZCLV (zoned constant linear velocity) technique. Accordingly, the information recording plane of the optical disc substrate 101 is divided into a plurality of zones in the radial direction thereof. These zones are defined so as to have a substantially equal size (i.e., width) as measured in the radial direction. Each of these zones includes the same number of tracks. However, the number of sectors included in one zone (or in a track of the zone) is different from the number of sectors included in another zone (or in a track of the zone). That is to say, the number of sectors included in an outer-periphery zone or a track thereof is greater than the number of sectors included in an inner-periphery zone or a track thereof. More specifically, the number of sectors included in each track in one zone is set greater by one than the number of sectors included in each track in another zone that is adjacent to the former zone and closer to the inner periphery.

The number of revolutions of the optical disc substrate 101 is controlled at a constant value within the same zone. However, the number of revolutions differs from one zone to another. Specifically, the number of revolutions of the optical disc substrate 101 in an outer-periphery zone is smaller than in an inner-periphery zone. Accordingly, the linear velocity at which a laser beam spot moves on the disc or the recording linear density is kept substantially constant for different zones.

Figure 2:
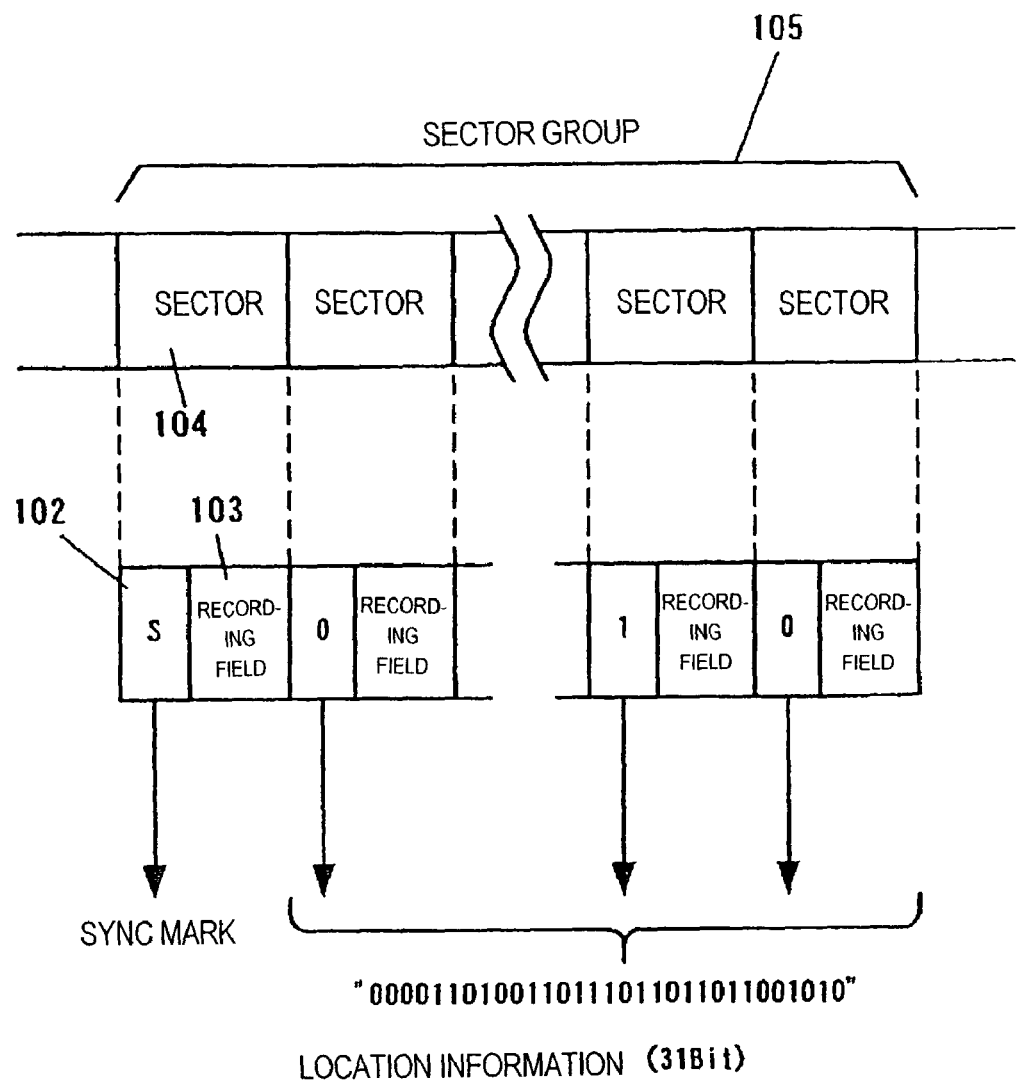
FIG. 2 shows a relationship between sectors and a sector group in the optical disc of the present invention.

Next, the relationship between the sectors 104 and a sector group 105 on the optical disc medium of the present invention will be described in further detail with reference to FIG. 2.

In the optical disc of this embodiment, a track is made up of a plurality of contiguous sector groups 105. Each of these sector groups 105 consists of 32 sectors 104 that are continuous with each other on the track. Each of these sectors 104 includes a header field 102 located at the top thereof and a recording field 103 that follows the header field 102.

In the sector 104 located at the top of each sector group 105, the header field 102 thereof has been provided with a sync mark "S" that has been formed in the shape of pits (i.e., pre-formatted). When the sync mark "S" is detected by a variation in intensity of the light reflected from the optical disc, the top of the sector group 105 can be located.

In each of the 31 sectors 104 that follow the first sector 104 in the sector group 105, the header field thereof is provided with a positive or negative mark that has also been formed in the shape of pits. By allocating information bits "1" and "0" to the positive and negative marks, respectively, each of the sectors 104 included in each sector group 105 can have one-bit information.

By pre-arranging the sync mark, positive marks and negative marks (i.e., identification marks) in each sector group 105 in this manner, 31-bit information can be recorded on the sector group 105. Furthermore, the 31-bit information is divided into 31 pieces, which are distributed to the 31 sectors 104, respectively.

In this embodiment, the 31-bit information is divided into 19-bit main information and 12-bit sub-information, and the 19-bit main information is used as the location information of the sector group 105. Then, the locations of $19^{th}$ power of 2 (=524,288) sector groups 105 can be specified by the main information thereof. Accordingly, supposing the top sector group of the overall optical disc has location information of zero and the following sector groups have location information that increases one by one from zero to represent the absolute locations of the sector groups 105 by the 19-bit main information, $19^{th}$ power of 2 sector groups 105 can be provided per disc. Thus, if a single sector 104 has information of 2,048 bytes and a single sector group 105 has information of 65,536 (=2,048×32) bytes, the maximum amount of data that can be accessed through the 19-bit main information is 34 gigabytes.

On the other hand, an error correction code is allocated to the 12-bit sub-information. Even if any bit included in the 19-bit main information or the 12-bit sub-information is lost because of a defect or some other reason or even if information is detected erroneously during a read operation, the error can be corrected by using this error correction code. For example, this error correction code may be used for all of the information of 31 bits.

If the location information of the sector groups 105 increases one by one monotonically along the tracks, the location information represented by the high-order bits of one sector group 105 is predictable from the location information of the previous sector group 105. Accordingly, the low-order 8 bits of the 12-bit sub-information may also be used as the error correction code, for example.

Next, exemplary physical shapes of the header fields 102 will be described with reference to FIGS. 3(*a*) and 3(*b*).

Figure 3A:
FIGS. 3(a) through 3(c) illustrate physical shapes of header fields on the optical disc of the present invention.
Figure 3B:
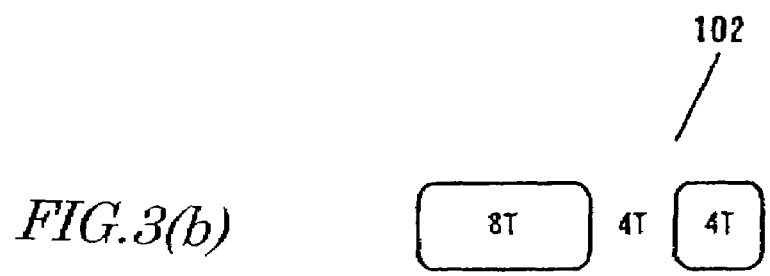
Figure 3C:
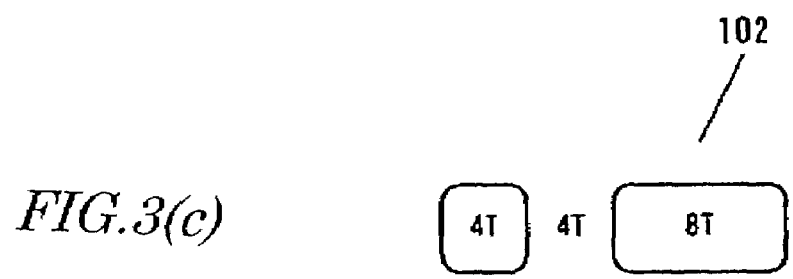

FIG. 3(*a*) illustrates an exemplary shape of a sync mark. This sync mark consists of a single pit having a length of 16T, where "1" is a reference clock period for recording. A length on the optical disc may be represented as a multiple of the distance that a light beam goes in one reference clock period (T). Accordingly, a pit having a length of 16T means a pit having a size corresponding to 16×T, which is a time it takes for a light spot formed on the rotating optical disc to move from one end of the pit to the other on the track.

FIG. 3(*b*) illustrates an exemplary shape for a positive mark. This positive mark is made up of a pit having a length of 8T and another pit that has been formed so as to be spaced apart from the former pit by 4T and that has a length of 4T.

FIG. 3(*c*) illustrates an exemplary shape for a negative mark. This negative mark is made up of a pit having a length of 4T and another pit that has been formed so as to be spaced apart from the former pit by 4T and that has a length of 8T.

In reading out location information, when a pit that is sufficiently longer than any of the pits included in the positive and negative marks (e.g., a pit having a length equal to or greater than that of a pit having an intermediate length (e.g., 12T) between the length (8T) of the longest pit in the positive and negative marks and the length of 16T of the sync mark pit) has been detected, then the mark detected may be specified as the sync mark shown in FIG. 3(*a*).

Also, where two pits having respective lengths of less than 12T have been detected consecutively, these two pits should be identified as the longer pit and the shorter pit. If the longer pit has been detected before the shorter pit, then the mark detected may be specified as the positive mark shown in FIG. 3(*b*). Conversely, if the shorter pit has been detected before the longer pit, then the mark detected may be specified as the negative mark shown in FIG. 3(*c*).

Alternatively, four detection windows may be provided on a 4T basis and the signals, detected at the respective centers of these detection windows, may be digitized. In that case, the marks detected may be specified by the digitized signals in the following manner. Specifically, if the digitized signals are "1111", then the mark detected may be specified as a sync mark. If the digitized signals are "1101", then the mark detected may be specified as a positive mark. If the digitized signals are "1011", then the mark detected may be specified as a negative mark. And if the digitized signals are none of these, then the mark detected may be regarded as an error.

According to these detection methods, there is no need to detect the absolute length every clock period although that detection is usually needed in reading out a data signal. Thus, the PLL does not have to lock onto a signal representing location information. As a result, the redundancy normally caused by a VFO and so on can be saved.

In this manner, the information recorded on each header field 102 of this embodiment is represented by a small number of pits as shown in FIGS. 3(*a*) through 3(*c*). For this reason, there is no need to lock the PLL for any header field. Accordingly, in reading multiple sectors consecutively, if the PLL is once locked in the recording field of a preceding sector and then kept locked even after a succeeding sector has been entered, then the state of the PLL in the preceding sector can also be held even in the recording field of the succeeding sector. Thus, the PLL does not have to be locked all over again, and the VFO area may be omitted from the recording field or the length thereof may be minimized. To eliminate the VFO areas from the recording fields in this manner, the space (i.e., the header gap) between the preceding and succeeding recording fields should have a length at most equivalent to the response time of the PLL. In this embodiment, the response time of the PLL is about 200T.

Next, exemplary arrangements of the sync marks, positive marks and negative marks (which will be herein referred to simply as "identification marks" collectively) on the optical disc will be described with reference to FIGS. 4(a) through 4(d).

Figure 4A:
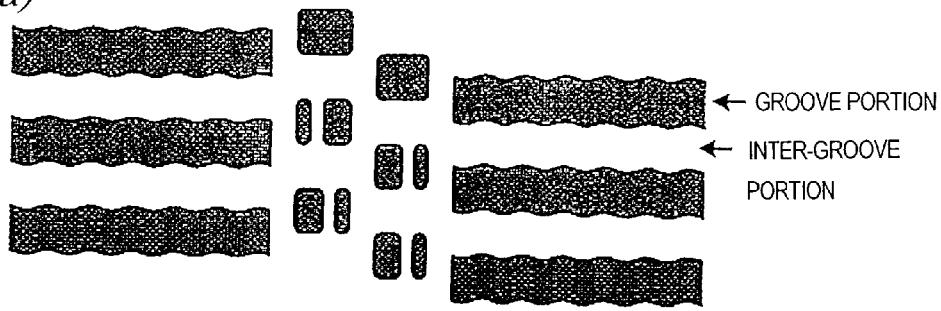
FIGS. 4(a) through 4(d) illustrate exemplary arrangements of identification marks that may be used for the optical disc of the present invention.

Suppose the optical disc substrate 101 is an optical disc of a land/groove recording type, which includes both wobbling lands (or groove portions) and grooves (or inter-groove portions) as its tracks and on which information can be recorded on both the lands and grooves. In that case, as shown in FIG. 4(a), for example, the identification marks may be arranged between the lands (or groove portions) and grooves (or inter-groove portions) so as to be on the tracks but shifted from the respective centers of the tracks by one half track pitch. In such an arrangement, by reference to a signal level balance between an identification mark on the disc inner periphery and another identification mark on the disc outer periphery, it is possible to detect how much the light beam following the tracks is shifted from the centers thereof, and correct the shift, on a sector-by-sector basis.

Figure 4B:
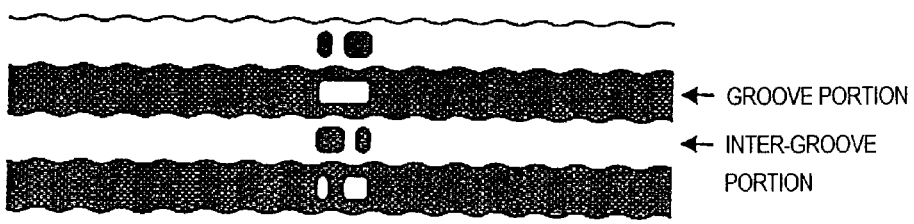

Alternatively, if no such correction is needed, then those identification marks may also be arranged on the track centerlines of the lands and grooves as shown in FIG. 4(b).

Figure 4C:
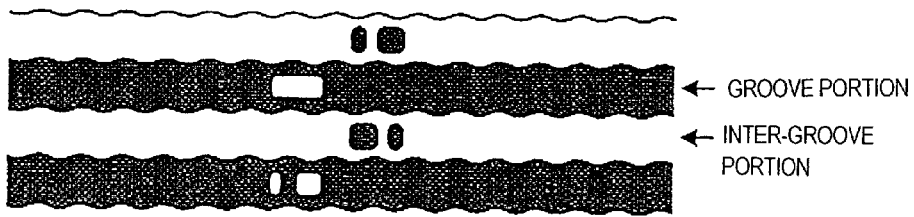

Also, to prevent any interference from occurring between adjacent identification marks, the identification marks may be alternately arranged on the lands and on the grooves so as to be shifted from each other as shown in FIG. 4(c).

Figure 4D:
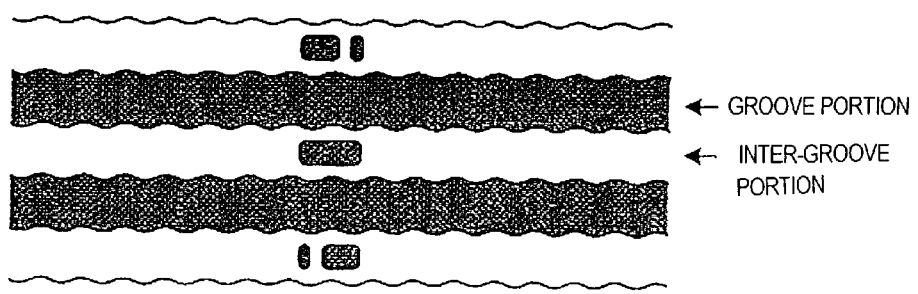

On the other hand, the optical disc substrate 101 may be an optical disc of the type recording information only on the lands or only on the grooves. For example, supposing information should be recorded only on the grooves (or inter-groove portions), the identification marks may be arranged only on the inter-groove portions, or the tracks on which the information is recorded, as shown in FIG. 4(d).

According to this embodiment, to access a particular sector in a sector group, first, a given sector group is identified by detecting the location information of the sector group. In this manner, the sector group including the target sector can be accessed. Next, the sectors of that sector group are counted one by one from the top sector thereof, thereby accessing the target sector.

In the embodiment described above, the identification mark is disposed at the beginning of each sector. However, the identification mark does not have to be detected at the beginning of each sector. Alternatively, the identification mark may be disposed at the end of each sector, for example.

Figure 13:
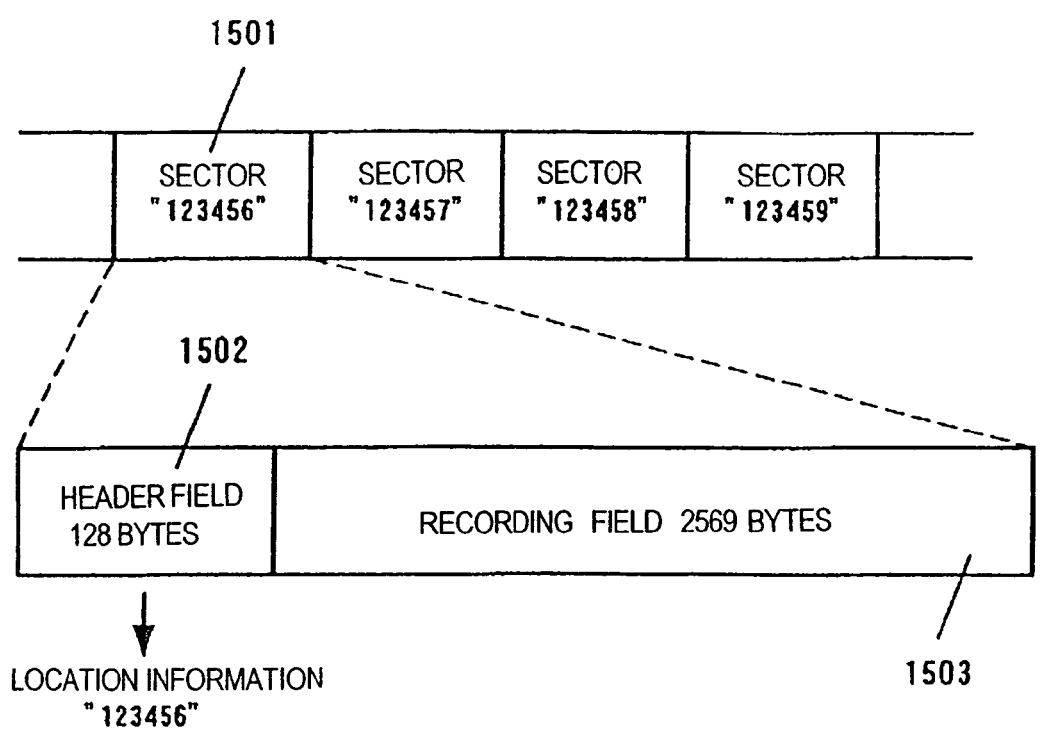
FIG. 13 shows a sector arrangement on a conventional optical disc.

As described above, in the optical disc of this embodiment, each sector group is made up of a predetermined number of (a plurality of) sectors, and the location information of each sector group is divided and distributed to the respective sectors of the sector group. The identification marks, representing the location information of each sector group, are arranged dispersively and periodically only within relatively short areas (having a length of 20T or less) between the recording fields of adjacent sectors. In this manner, the overhead can be reduced, and the adverse effects of local loss resulting from defects, for example, can be minimized, thereby increasing the reliability. More specifically, in the conventional example illustrated in FIG. 13, the area on which user data cannot be written (i.e., the overhead) accounts for as much as 5% of the overall area of the tracks. In contrast, according to this embodiment, the overhead can be reduced to as low as about 1% of the overall track area.

It should be noted that the location information of each sector group does not have to be distributed to a plurality of sectors that makes up the same sector group. For example, the location information of each sector group may also be distributed to a plurality of sectors that makes up another sector group, which is located on the same track to which the former sector group belongs. This point will be described in further detail later with reference to FIGS. 5 and 11.

Exemplary Zone Arrangement 1

An exemplary zone-by-zone arrangement for an optical disc according to the present invention is shown in the following Table 1:

TABLE 1

| Zone No. | Number of sectors per track | Number of Tracks | Number of Sectors | Number of Sector groups | Number of Remainder Sectors |
|---|---|---|---|---|---|
| 0 | 19 | 1,888 | 35,872 | 1,121 | 0 |
| 1 | 20 | 1,888 | 37,760 | 1,180 | 0 |
| 2 | 21 | 1,888 | 39,648 | 1,239 | 0 |
| 3 | 22 | 1,888 | 41,536 | 1,298 | 0 |
| 4 | 23 | 1,888 | 43,424 | 1,357 | 0 |
| 5 | 24 | 1,888 | 45,312 | 1,416 | 0 |
| 6 | 25 | 1,888 | 47,200 | 1,475 | 0 |
| 7 | 26 | 1,888 | 49,088 | 1,534 | 0 |
| 8 | 27 | 1,888 | 50,976 | 1,593 | 0 |
| 9 | 28 | 1,888 | 52,864 | 1,652 | 0 |
| 10 | 29 | 1,888 | 54,752 | 1,711 | 0 |
| 11 | 30 | 1,888 | 56,640 | 1,770 | 0 |
| 12 | 31 | 1,888 | 58,528 | 1,829 | 0 |
| 13 | 32 | 1,888 | 60,416 | 1,888 | 0 |
| 14 | 33 | 1,888 | 62,304 | 1,947 | 0 |
| 15 | 34 | 1,888 | 64,192 | 2,006 | 0 |
| 16 | 35 | 1,888 | 66,080 | 2,065 | 0 |
| 17 | 36 | 1,888 | 67,968 | 2,124 | 0 |
| 18 | 37 | 1,888 | 69,856 | 2,183 | 0 |
| 19 | 38 | 1,888 | 71,744 | 2,242 | 0 |
| 20 | 39 | 1,888 | 73,632 | 2,301 | 0 |
| 21 | 40 | 1,888 | 75,520 | 2,360 | 0 |
| 22 | 41 | 1,888 | 77,408 | 2,419 | 0 |
| 23 | 42 | 1,888 | 79,296 | 2,478 | 0 |

In the example shown in Table 1, the number of sectors that makes up each zone is (the number of sectors per track)×(the number of tracks). The number of sector groups is the quotient given by (the number of sectors)÷(the number of sectors that makes up each sector group). On the other hand, the number of remainder sectors, which are extra sectors that do not make up any sector group, is obtained as the remainder of (the number of sectors)÷(the number of sectors that makes up each sector group). In this case, the remainder sectors that do not make up any sector group have no location information and the absolute locations thereof are non-specifiable. Thus, the remainder sectors are not used to record information thereon.

As shown in Table 1, the number of tracks included is the same in each and every zone on the optical disc of this embodiment. Specifically, 1,888 tracks belong to each and every zone. Supposing the number of sectors per track in a zone is n, the number of sectors that makes up that zone is 1,888×n, which is a multiple of the number of sectors of "32" that makes up each sector group. That is to say, in this embodiment, the number of sectors that makes up each zone is a multiple of the number of sectors that makes up each sector group, and the number of remainder sectors that do not make up any sector group is zero. Thus, each and every sector in a zone can be used without leaving any extra sector.

Exemplary Arrangement 1 of the Location Information of a Sector Group

An exemplary arrangement of the location information in a sector group on the optical disc of the present invention will be described more specifically with reference to FIG. 5. In the example shown in FIG. 5, a sync mark "S" is provided for the top sector among a plurality of sectors that makes up the sector group 105 specified by an address "123456". The internal arrangement of any other sector group 105 having a different address is the same as that of the sector group 105 specified by the address "123456".

Figure 5:
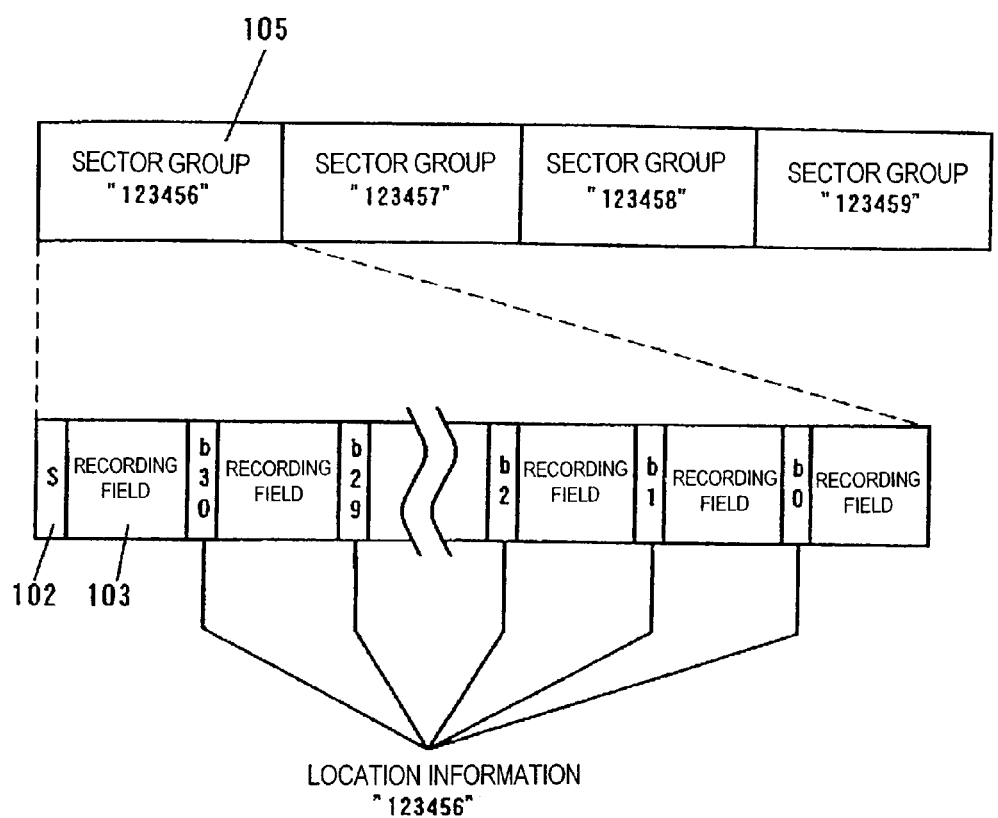
FIG. 5 shows an exemplary arrangement of location information on the optical disc of the present invention.

As shown in the lower part of FIG. 5, the 31 sectors that follow the top sector include the location information of the sector group 105 to which those sectors belong. This location information is represented by the identification marks of 31 bits b0 through b30. That is to say, the 31-bit identification marks have the location information "123456".

In the same way, in the sector group 105 specified by an address "123457", the location information "123457" is recorded dispersively on the 31 sectors 104 that make up the sector group 105.

In this manner, in the example shown in FIG. 5, the address g of each sector group is specified by the identification marks that are distributed to a plurality of sectors that makes up the same sector group. On the other hand, in another exemplary location information arrangement to be described later with reference to FIG. 11, the location information of each sector group is distributed to a plurality of sectors that are included in the previous sector group on the same track. The advantages and disadvantages of these two exemplary arrangements will be mentioned after the arrangement shown in FIG. 11 has been described.

Buffer Track

A zone boundary area on the optical disc of the present invention will be described with reference to FIGS. 6(a) and 6(b).

Figure 6A:
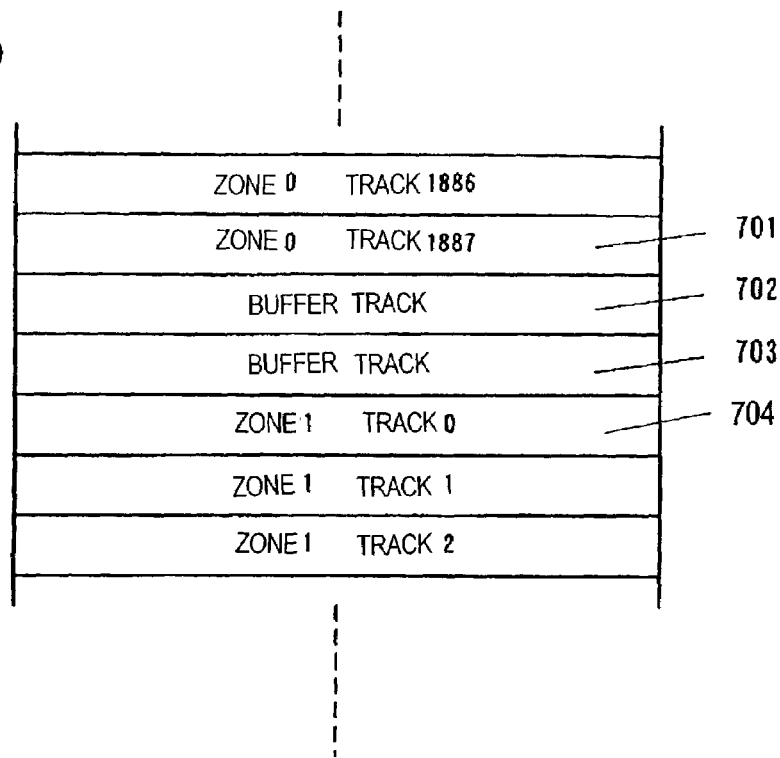
FIGS. 6(a) and 6(b) show a buffer track on the optical disc of the present invention.
Figure 6B:
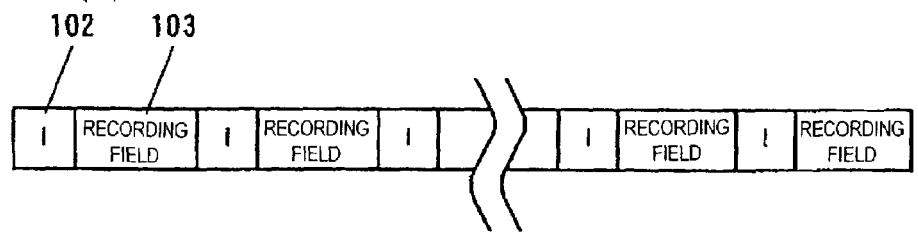

FIG. 6(a) shows some of the tracks in and between Zones Nos. 0 and 1. Specifically, the reference numeral 701 denotes the last track belonging to Zone No. 0, the reference numerals 702 and 703 denote buffer tracks and the reference numeral 704 denote the first track belonging to Zone No. 1. FIG. 6(b) shows the arrangement of the buffer track 702 shown in FIG. 6(a).

Since Zones Nos. 0 and 1 have mutually different numbers of sectors per track, the sector arrangement angles are different from each other in the zone boundary area. As a result, interference might occur between a header field in one track and a recording field in another adjacent track. To prevent this interference, the buffer tracks 702 and 703 are sometimes provided between the zones as shown in FIG. 6(a). The buffer tracks 702 and 703 belong to neither Zone No. 0 nor Zone No. 1 and are non-usable dummy tracks.

In this embodiment, the header field of each of the sectors that make up the buffer tracks 702 and 703 as dummy tracks is provided with an invalidity mark "I", thereby distinguishing these dummy sectors from sectors on the tracks having valid information thereon.

Suppose a light beam spot is now moving from Zone No. 0 into Zone No. 1 during a write, read or standby mode. In this case, first, the light beam spot moves from the last track 701 of Zone No. 0 to enter a dummy sector as one of the sectors making up the buffer track 702. Next, when the invalidity mark is detected from the header field of the dummy sector on the buffer track 702, that sector is regarded as a dummy sector. Then, processing of moving into Zone No. 1 is performed so that the light beam spot can move into the first track 704 of Zone No. 1 quickly.

Furthermore, if the buffer track 702 or 703 is tracked during a seek mode, then the track is recognizable as a dummy track just by detecting the header field of one sector, not by detecting 32 sectors as needed to detect the location information of a sector group. Accordingly, the next processing can be started very quickly.

The invalidity mark "I" may be formed like the sync mark shown in FIG. 3(a), for example. In that case, a given sector is not identifiable as a dummy sector by itself. However, as soon as the same sync mark is detected from two consecutive sectors, those sectors may be identified as dummy sectors. By providing the invalidity mark for the dummy sectors in this manner, the access performance is improvable.

Logical Processing Block

In recording information on an optical disc, normally some logical processing is performed. For example, an error correction code is added to correct an error occurring during a read or write operation. Or to prevent errors from being caused locally in a particular part, interleaving processing is performed by rearranging the code sequences. When such an error correction code is added or when such interleaving is performed, the processing may be carried out using a predetermined number of sectors as one block.

Figure 7A:
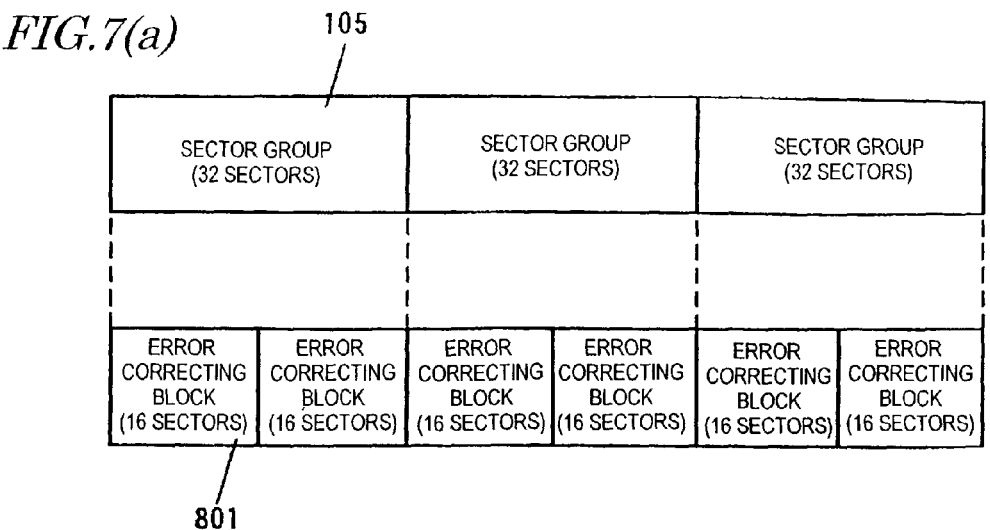
FIGS. 7(a) and 7(b) show a relationship between sector groups and logical processing blocks on the optical disc of the present invention.
Figure 7B:
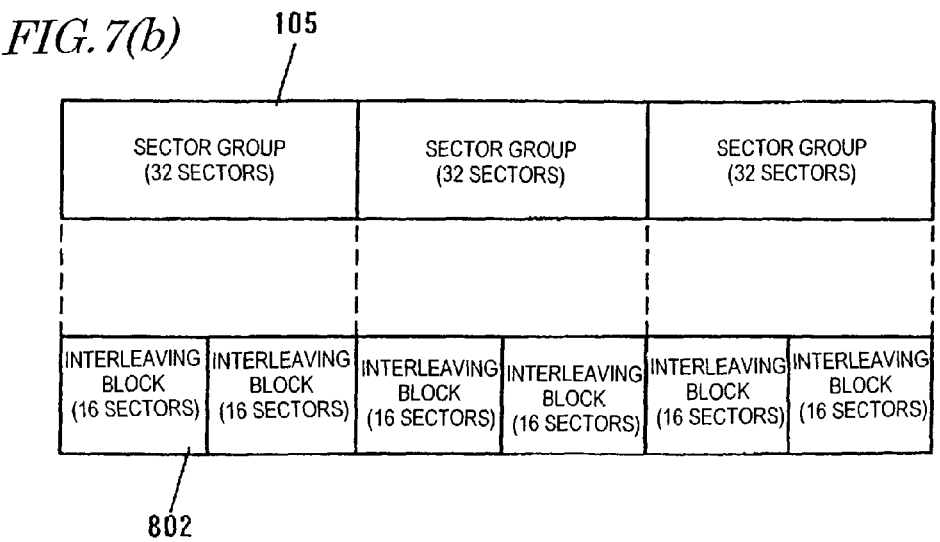

The relationship between the sector groups and the logical processing blocks on an optical disc will be described with reference to FIGS. 7(a) and 7(b). FIG. 7(a) shows a relationship between the sector groups and error correcting blocks, while FIG. 7(b) shows a relationship between the sector groups and interleaving blocks. In FIG. 7(a), the reference numeral 801 denotes the error correcting blocks. In FIG. 7(b), the reference numeral 802 denotes the interleaving blocks.

In writing and/or reading information on/from the optical disc of the present invention, the error correction and interleaving may be carried out on a 16 sector basis. On the other hand, each sector group 105 is made up of 32 sectors in this embodiment. That is to say, the number of sectors of "32" that makes up one sector group 105 is a multiple of the number of sectors of "16" that makes up one error correcting or interleaving block 801 or 802. Furthermore, in the optical disc of this embodiment, the start sector of each sector group 105 is the start sector of the error correcting block 801 or the interleaving block 802.

In actually writing or reading information, the location information is obtained only on a sector group basis. Accordingly, even if just a portion of one sector group 105 needs to be read, that sector group should be read entirely and the location information of that sector group should be acquired. For example, if the number of sectors that makes up one sector group 105 were not correlated to the error correcting block 801 or interleaving block 802, then the logical processing such as error correction or interleaving should be carried out on multiple sector groups 105.

According to this embodiment, however, the number of sectors that makes up one sector group is a multiple of the number of sectors that makes up one error correcting or interleaving block. In addition, the start sector of each sector group is identical with the start sector of each error correcting or interleaving block. Thus, the performance of the error correction or interleaving processing is improvable.

Replacement Processing

A method for performing replacement processing on the optical disc of the present invention will be described with reference to FIG. 8.

User data is sequentially written on the optical disc while detecting the location information of the sector groups. Once the user data has been written on a user area, verify processing (i.e., write verify) is carried out to see if the data has been written successfully. In normal verify processing, if errors have occurred in an error correcting block at less than a predetermined error rate, then the data written is verified and the next processing is started. However, if there are any defects on the disc and if errors have occurred in an error correcting block at the predetermined error rate or more, then the block is regarded as defective and replacement processing is carried out.

Figure 8:
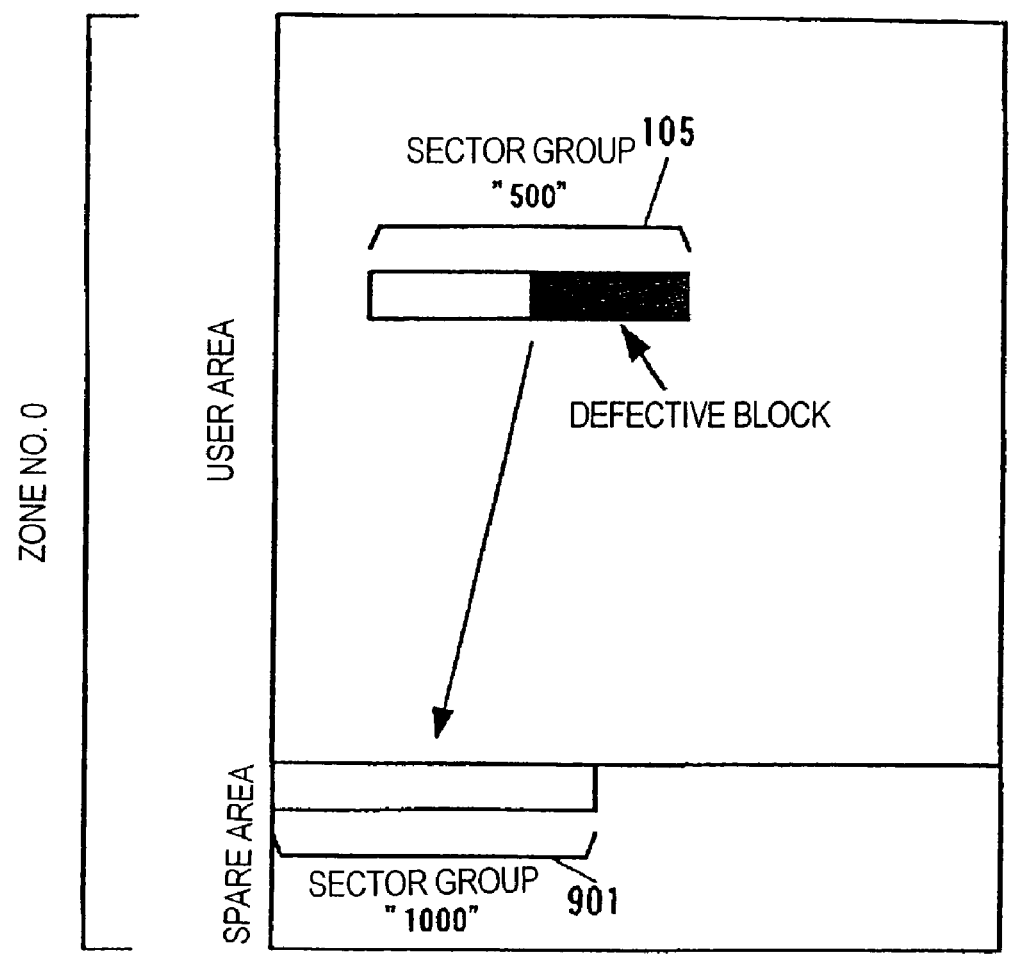
FIG. 8 shows how replacement processing may be performed on the optical disc of the present invention.

In this embodiment, each zone includes a user area and a spare area as shown in FIG. 8. User data is written on the user area, while user data, which should have been written in a part of the user area on/from which the data has been once written or read but which has been detected as defective, is written on the spare area.

For example, the user area may include sector groups 105 specified by addresses "0" through "999", while the spare area may include spare sector groups 901 specified by addresses "1000" through "1128".

Suppose when user data is written on a sector group 105 specified by an address "500" and then subjected to verify processing, the latter second error correcting block, included in the two error correcting blocks associated with the sector group, is regarded as a defective block. In that case, the former first error correcting block and the second error correcting block are both replaced with one spare sector group 901 specified by an address "1000", and the sector group 105 specified by the address "500" is also replaced with the same spare sector group 901 specified by the address "1000". This replacement is registered in a replacement list. Optionally, information about the replacement of the first and second error correcting blocks associated with the sector group 105 specified by the address "500" may be registered in the list.

In a read operation on the other hand, the sector groups are sequentially read one after another. Specifically, when a sector group 105 specified by an address "499" has been read, the next sector group to be read will be the spare sector group 901 specified by the address "1000" in accordance with the information that has been registered in the replacement list. When the spare sector group 901 specified by the address "1000" has been read, a sector group 105 specified by an address "501" will be read next.

In this manner, according to this embodiment, the replacement processing is carried out on a sector group basis. Thus, while sector groups are being read, the alternate sector group can start being read quickly without detecting the location information of the original sector group that has been replaced with the alternate sector group. As a result, the replacement processing can be performed at a higher processing speed.

Sector Location Information in Recording Field

Figure 9:
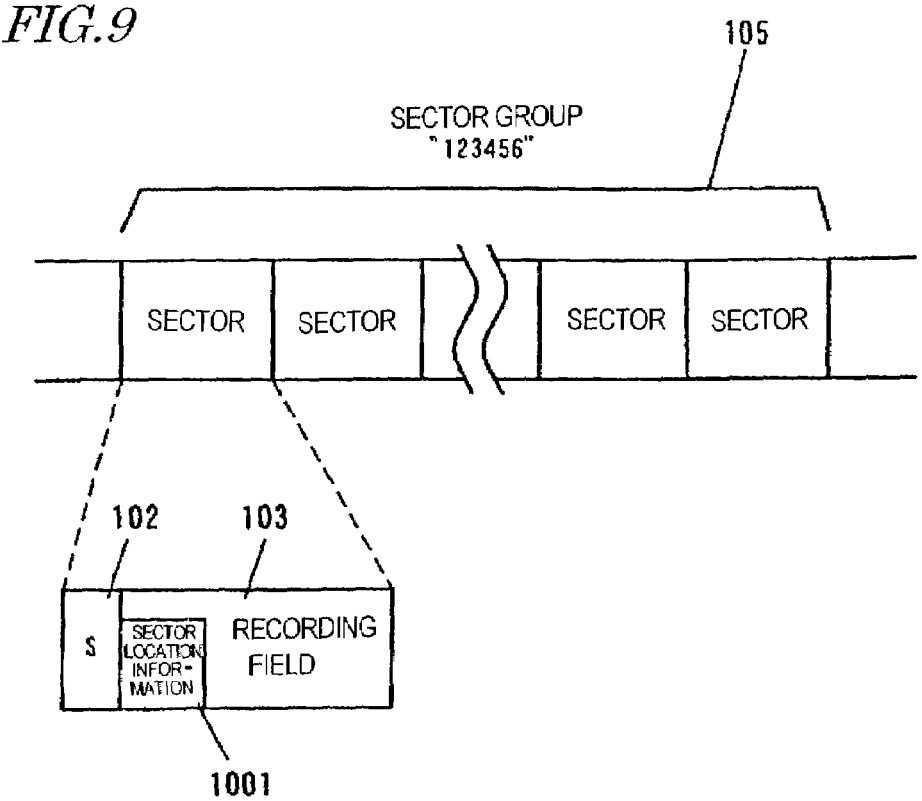
FIG. 9 shows the details of a sector on the optical disc of the present invention.

Another embodiment of an optical disc according to the present invention will be described with reference to FIG. 9. In this embodiment, sector location information 1001, representing the location of a sector, is provided within the recording field 103, not within the header field 102. When information such as user data is written on the recording field 103, the sector location information 1001 is recorded at the top of the main information. In this manner, if the sector location information 1001 is recorded at the top of the information to be recorded on the recording field 103, then no VFO area and other areas are needed to read the sector location information 1001. As a result, the degree of redundancy can be reduced.

As the sector location information 1001, information defined by (the location information of a sector group)× 32+(a sector number in the sector group) may be selected, for example. Alternatively, the sector location information 1001 may also be a logical address different from the location information of its sector group, for example. As used herein, the "logical address" is an address to be read by an apparatus (e.g., host computer) which is located at a higher level than the optical disc drive.

In this embodiment, when a recorded part is sought, the sector location information 1001 is detected before the location information of its sector group 105 is detected from the 32 sectors of the sector group 105. Then, just by reading at least one sector, the absolute location of the sector can be specified. Furthermore, when operation processing is performed after that, the location information of its sector group can also be confirmed.

In this manner, the location information of each sector is recorded, along with the information to be written, on the optical disc of this embodiment, thus improving the access performance.

Exemplary Zone Arrangement 2

Another exemplary zone arrangement for an optical disc according to the present invention will be described with reference to the following Table 2:

TABLE 2

| Zone No. | Number of sectors per track | Number of Tracks | Number of Sectors | Number of Sector Groups | Number of Remainder sectors |
|---|---|---|---|---|---|
| 0 | 19 | 1,900 | 36,100 | 1,128 | 4 |
| 1 | 20 | 1,900 | 38,000 | 1,187 | 16 |
| 2 | 21 | 1,900 | 39,900 | 1,246 | 28 |
| 3 | 22 | 1,900 | 41,800 | 1,306 | 8 |
| 4 | 23 | 1,900 | 43,700 | 1,365 | 20 |
| 5 | 24 | 1,900 | 45,600 | 1,425 | 0 |
| 6 | 25 | 1,900 | 47,500 | 1,484 | 12 |
| 7 | 26 | 1,900 | 49,400 | 1,543 | 24 |
| 8 | 27 | 1,900 | 51,300 | 1,603 | 4 |
| 9 | 28 | 1,900 | 53,200 | 1,662 | 16 |
| 10 | 29 | 1,900 | 55,100 | 1,721 | 28 |
| 11 | 30 | 1,900 | 57,000 | 1,781 | 8 |
| 12 | 31 | 1,900 | 58,900 | 1,840 | 20 |
| 13 | 32 | 1,900 | 60,800 | 1,900 | 0 |
| 14 | 33 | 1,900 | 62,700 | 1,959 | 12 |
| 15 | 34 | 1,900 | 64,600 | 2,018 | 24 |
| 16 | 35 | 1,900 | 66,500 | 2,078 | 4 |

TABLE 2-continued

| Zone No. | Number of sectors per track | Number of Tracks | Number of Sectors | Number of Sector Groups | Number of Remainder sectors |
|---|---|---|---|---|---|
| 17 | 36 | 1,900 | 68,400 | 2,137 | 16 |
| 18 | 37 | 1,900 | 70,300 | 2,196 | 28 |
| 19 | 38 | 1,900 | 72,200 | 2,256 | 8 |
| 20 | 39 | 1,900 | 74,100 | 2,315 | 20 |
| 21 | 40 | 1,900 | 76,000 | 2,375 | 0 |
| 22 | 41 | 1,900 | 77,900 | 2,434 | 12 |
| 23 | 42 | 1,900 | 79,800 | 2,493 | 24 |

In the optical disc zone arrangement that has already been described with reference to Table 1, the number of sectors that makes up each zone is a multiple of the number of sectors that makes up one sector group. Thus, the zone arrangement has a low degree of flexibility. In contrast, in the zone arrangement shown in Table 2, the number of sectors that makes up each zone is not a multiple of the number of sectors that makes up one sector group. In this exemplary zone arrangement, the number of tracks is determined by a track pitch that enables the optical disc to exhibit its highest recording performance, and the number of sectors per zone is determined by the number of tracks. Accordingly, there are some zones that include remainder sectors belonging to no sector groups.

Figure 10:
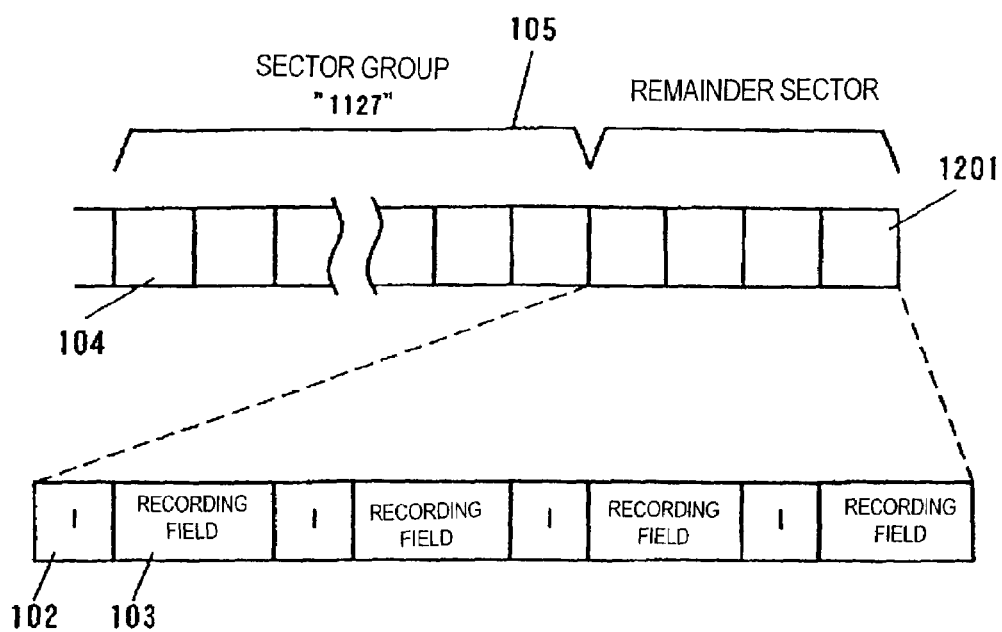
FIG. 10 shows the end of Zone No. 0 on the optical disc of the present invention.

FIG. 10 shows the end of Zone No. 0 on an optical disc having such a zone arrangement to a larger scale. Zone No. 0 consists of 1,128 sector groups 105 specified by addresses "0" through "1127" and four non-used remainder sectors 1201.

Each sector 104 in each sector group 105 includes valid information in its header field. On the other hand, each remainder sector 1201 has an invalidity mark "I" in its header field. Thus, each remainder sector 1201 is distinguished from each sector 104 including valid information.

In writing user data, for example, after the data has been written on the sector group 105 specified by the address "1127", the light beam spot enters the remainder sectors 1201. As the invalidity marks provided for the remainder sectors 1201 are detected at this time, the remainder sectors 1201 are skipped. As a result, no data is written on the remainder sectors and the light beam spot moves into Zone No. 1.

Alternatively, to detect the remainder sector 1201 more accurately, an invalidity signal may be recorded on the remainder sector 1201 without skipping the remainder sector 1201. In that case, when the invalidity signal is detected from the recording field 103, the sector in question is identifiable as the remainder sector 1201. As the invalidity signal to be written on the recording field of the remainder sector 1201, a pattern that does not exist in a modulation code is preferably used. For example, if the modulation code adopted is an eight-to-sixteen modulation code sequence, a continuous pattern of 14T may be recorded as the invalidity signal.

The invalidity mark "I" may be formed as the sync mark shown in FIG. 3(a). In that case, a given sector is not identifiable as a remainder sector by itself. However, if the same sync mark is detected from two consecutive sectors, then those sectors may be regarded as remainder sectors 1201.

As described above, in at least one zone, the number of sectors that makes up the zone is not a multiple of the number of sectors that makes up one sector group and the zone is provided with an appropriate number of remainder sectors when needed. Then, the disc can be designed more flexibly. Also, by providing an invalidity header for each remainder sector, the access performance is improvable. In addition, by recording no information on any remainder sector, the processing speed can be further increased. Optionally, when an invalidity signal is recorded on each remainder sector, the remainder sector can be detected more accurately.

Exemplary Arrangement 2 of the Location Information of a Sector Group

Another exemplary arrangement of the location information of a sector group on the optical disc of the present invention will be described with reference to FIG. 11.

An optical disc having the exemplary arrangement shown in FIG. 5 is compliant with a format in which the location information of a sector group is distributed within the same sector group. In that case, however, to detect the location information of a sector group, a plurality of sectors included in that sector group should be read, thus resulting in a low processing speed.

In the optical disc of this embodiment, the location information of each sector group is arranged differently from the example shown in FIG. 5. In the other respects, however, the optical disc of this embodiment is the same as the optical disc described above.

Figure 11:
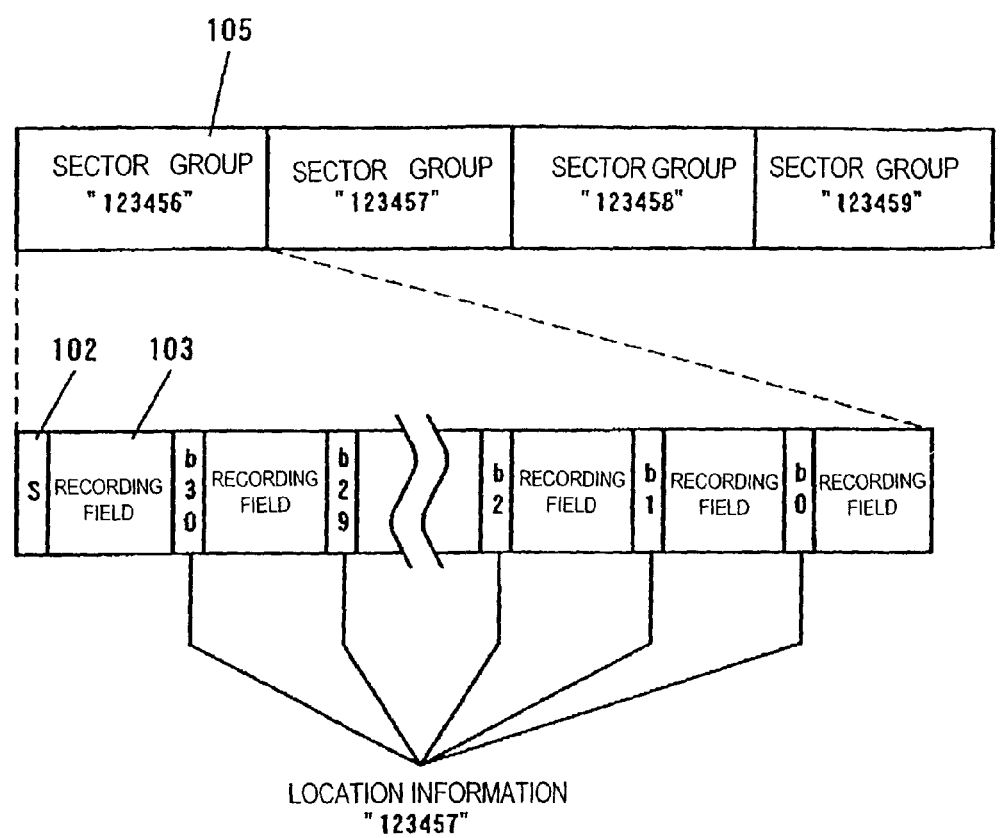
FIG. 11 shows another exemplary arrangement of location information on the optical disc of the present invention.

In FIG. 11, a sync mark "S" is provided for the first one of a plurality of sectors that makes up the sector group 105 specified by an address "123456", for example. However, the 31 sectors that follow the first sector do not include the location information of the sector group 105 to which those sectors belong but the location information "123457" of its succeeding sector group 105.

In the same way, as for the sector group 105 specified by an address "123457", location information "123458" is recorded dispersively on the 31 sectors 104 that makes up the sector group 105.

In this manner, a sector group specified by an address "G" includes location information "G+1" on the header fields of the sectors that makes up the sector group.

In such an arrangement, in reading the location information from the sector group 105 specified by the address "123456", the location information of the sector group 105 specified by the address "123457" will have been read at the header field 102 of the last sector of the sector group 105 specified by the address "123456". That is to say, before the sector group 105 specified by the address "123457" is reached, the location information "123457" will have been read. Accordingly, before a sector group is reached, the location information of that sector group can be detected, thus realizing quick processing.

However, if the location information of each sector group is distributed to a plurality of sectors included in the previous sector group on the same track, then the sectors, on which the location information of a sector group located at the top of each zone should be recorded, cannot be found at appropriate locations. As a result, such a sector group located at the top of each zone cannot be used to write user data or any other type of data thereon.

In contrast, in the example shown in FIG. 5, each and every sector group within a zone includes its own location information, and therefore, the sector groups within one zone can be all used.

Optical Disc Drive

Figure 12:
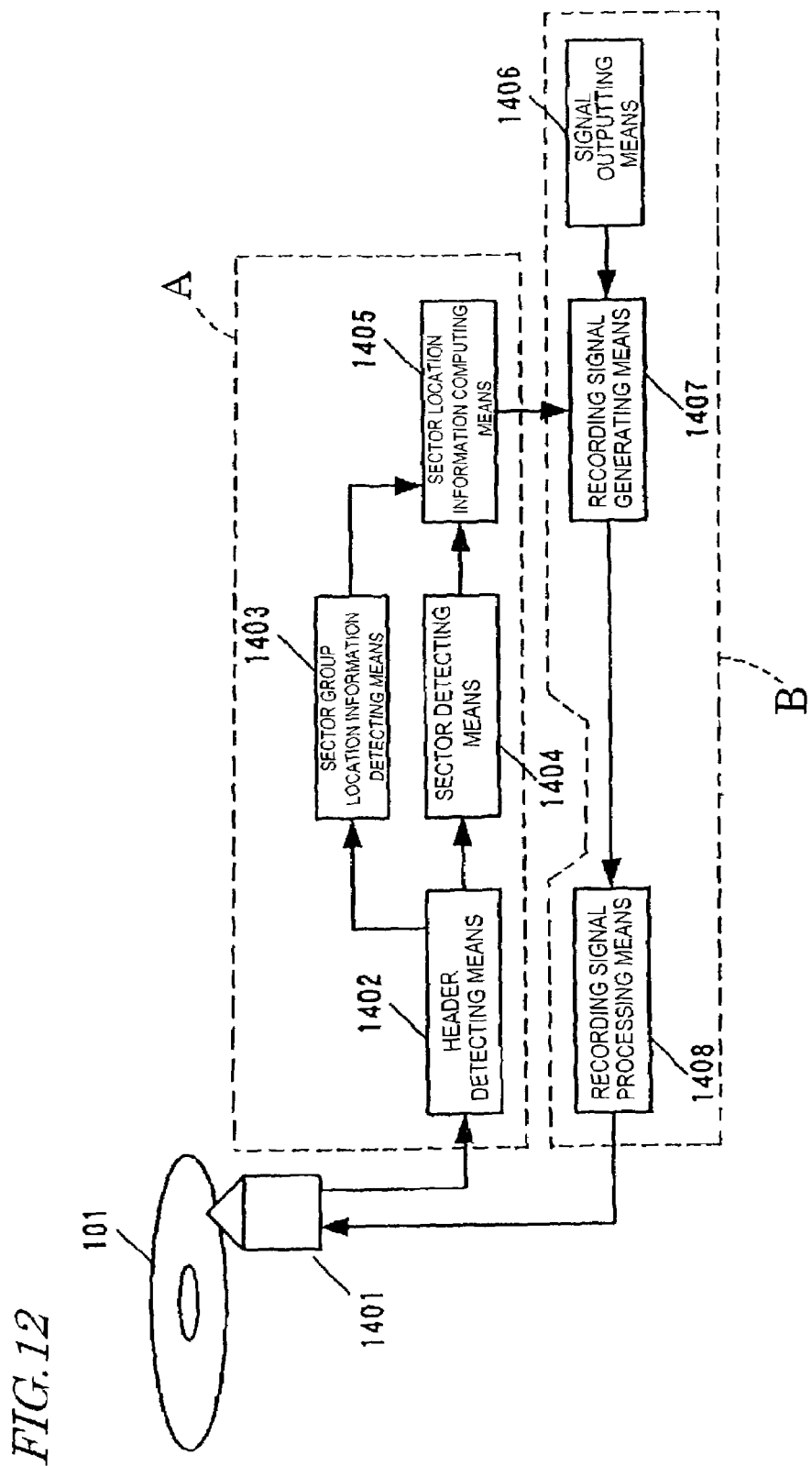
FIG. 12 is a block diagram illustrating an embodiment of an optical disc drive according to the present invention.

FIG. 12 illustrates an embodiment of an optical disc recorder according to the present invention. This optical disc recorder is suitably applicable for use to write and/or read information on/from the optical disc of the present invention described above.

This optical disc recorder includes: an optical head 1401 for focusing a laser beam on a track of an optical disc 101; a circuit A for detecting a sector location, to which the laser beam is irradiated, on the track by processing the output signal of the optical head 1401; and a circuit B for generating a recording signal based on the information to be written on the optical disc 101.

The optical head 1401 includes an element for performing electro-optical conversion to write information on a recording field of the optical disc 101 or to read information from a header field or a recording field of the optical disc 101. The optical head 1401 makes a light beam follow the tracks on the optical disc 101, receives the light that has been reflected from the optical disc 101 and reads and outputs a required signal based on the reflected light.

In accordance with an optical signal that has been output from the optical head 1401, the circuit A reads the location information of a sector from the optical disc 101. More specifically, the circuit A includes header detecting means 1402, sector group location information detecting means 1403, sector detecting means 1404 and sector location information computing means 1405. In response to the output signal of the optical head 1401, the header detecting means 1402 detects and identifies the header field of the sector irradiated with the light beam. The sector group location information detecting means 1403 detects the location information of the sector group based on the output of the header detecting means 1402. In accordance with the output of the header detecting means 1402, the sector detecting means 1404 detects and counts the sectors in the sector group, thereby outputting the number of the particular sector in the sector group. The sector location information computing means 1405 obtains the location information of the sector in question by performing computation on the output of the sector group location information detecting means 1403 and on the output of the sector detecting means 1404.

The circuit B includes signal outputting means 1406, recording signal generating means 1407 and recording signal processing means 1408. The signal outputting means 1406 outputs user data and a signal such as an invalidity signal. In accordance with the outputs of the sector location information computing means 1405 and signal outputting means 1406, the recording signal generating means 1407 generates a recording signal. And the recording signal processing means 1408 converts the output signal of the recording signal generating means 1407 into a recording laser signal.

Hereinafter, it will be described how to record information on the optical disc of the present invention by using this optical disc recorder.

First, it will be described how to write data on the optical disc that has already been described with reference to FIG. 9. Then, the sector location information computing means 1405 obtains and outputs the sector location information based on the sector group location information that has been output from the sector group location information detecting means 1403 and the sector number in the sector group that has been output from the sector detecting means 1404. In this case, the sector location information is defined by (sector group location information)×32+(the sector number in the sector group).

Next, the recording signal generating means 1407 adds the sector-by-sector data, which has been supplied from the signal outputting means 1406, to the sector location information and then subjects it to various types of processing, including modulation (e.g., eight-to-sixteen modulation) and the addition of SYNC (synchronization code), thereby generating and outputting a recording signal. In accordance with the output signal of the recording signal generating means 1407, information is recorded on the optical disc 101 by way of the recording signal processing means 1408.

Next, it will be described how to write data on the optical disc including the remainder sectors 1201 shown in FIG. 10. The optical disc used may be of a type recording no signals on any of the remainder sectors 1201. In that case, when the sector group location information detecting means 1403 detects an invalidity mark, the recording signal processing means 1408 operates in such a manner as to output no recording laser signals. On the other hand, the optical disc used may also be of the type recording an invalidity signal on each of the remainder sectors 1201. In such a situation, when the sector group location information detecting means 1403 detects an invalidity mark, the signal outputting means 1406 outputs an invalidity signal as the sector data. As a result, the invalidity signal is recorded on the optical disc.

In this manner, the optical disc recorder of this embodiment can appropriately record information on any of the various types of optical discs according to the present invention.

INDUSTRIAL APPLICABILITY

In the optical disc of the present invention, a sector group is made up of a predetermined number of sectors, the location information of the sector group is divided into multiple pieces each including a predetermined amount of information, and the location information is distributed to the multiple sectors in the sector group. Thus, the overhead can be reduced and the unwanted effects of local loss due to defects, for example, can also be reduced. As a result, the location information can be detected much more reliably.

Also, according to the recording method of the present invention, when recording is performed on the optical disc, replacement processing is carried out on the basis of a sector group, which constitutes a minimum unit representing the location information. Thus, the replacement processing can be performed at a higher processing speed.

In an embodiment where the location information of each sector of the optical disc is recorded on that sector along with the information to be written thereon, that sector can be read without detecting the location information of its sector group. Then, the absolute location of the sector can be specified quickly and the access performance is improvable. Furthermore, in an embodiment where recording is performed on the optical disc including remainder sectors, no information may be recorded on any of the remainder sectors and the next processing may be started immediately. Then, the processing speed can be increased.

Also, in another embodiment where recording is performed on the optical disc including the remainder sectors, an invalidity signal may be recorded on each of those remainder sectors. In that case, when the invalidity signal is detected during a read operation, the given sector is identifiable as a remainder sector. Since the remainder sector can also be detected by an identification mark, the remainder sector is detectible even more accurately.

In an optical disc recorder according to the present invention, where the location information of each sector is recorded on that sector along with the information to be written thereon, that sector can be read without detecting the location information of its sector group. Then, the absolute location of the sector can be specified and the access performance is improvable. In an embodiment where recording is performed on the optical disc including remainder sectors, no information may be recorded on any of the remainder sectors and the next processing may be started immediately. Then, the processing speed can be increased. Alternatively, an invalidity signal may be recorded on each of those remainder sectors. In that case, when the invalidity signal is detected during a read operation, the given sector is identifiable as a remainder sector. Since the remainder sector can also be detected by an identification mark, the remainder sector is detectible even more accurately.

The invention claimed is:

1. An optical disc medium comprising a plurality of sector groups, each said sector group being made up of multiple sectors that are contiguous with each other in a circumferential direction on a track, wherein in at least some of the sector groups, location information, representing the location thereof on the optical disc medium, is divided into multiple pieces of information and distributed to associated ones of the sectors on the same track, wherein said associated ones of the sectors constitutes a minimum read/write unit that has its address defined by the location information, and the location information is preformatted on the optical disc, and wherein the number of sectors that makes up each said sector group is a multiple of the number of sectors that makes up a sector block on which logical processing is performed.

2. The optical disc medium of claim 1, wherein the location information is represented by a plurality of identification marks that are formed as embossed pits.

3. The optical disc medium of claim 2, wherein each said embossed pit is formed between recording fields of associated ones of the sectors that are adjacent to each other in the circumferential direction on the track.

4. The optical disc medium of claim 2, wherein each said identification mark assumes one of three mutually different states and represents synchronization information or one-bit information of 1 or 0 by any of the three different states.

5. The optical disc medium of claim 4, wherein the optical disc medium comprises a non-usable dummy sector, and wherein the identification mark included in the dummy sector is provided with invalidity information that makes the sector identifiable as the dummy sector.

6. The optical disc medium of claim 5, wherein the invalidity information is identical with the synchronization information.

7. The optical disc medium of claim 2, wherein each said identification mark is provided within a header gap that has a length of 200T or less in a direction in which the track extends, where T is a distance that a light beam goes in one reference clock period.

8. The optical disc medium of claim 2, wherein each said identification mark is made up of at most two of the embossed pits.

9. The optical disc medium of claim 2, wherein the identification marks are arranged on a centerline of the track on which information is recorded.

10. The optical disc medium of claim 2, wherein the identification marks are arranged so as to be shifted by a half track pitch from a centerline of the track on which information is recorded.

11. The optical disc medium of claim 1, wherein the sectors included in each said sector group are 32 contiguous sectors.

12. The optical disc medium of claim 1, wherein the optical disc medium has a recording plane that is divided into a plurality of band-like zones, the zones being arranged concentrically around the center of the disc medium, and wherein multiple tracks are included in each said zone, the number of sectors included in each said track changing on a zone-by-zone basis, and wherein the number of sectors included in each said zone is a multiple of the number of sectors that makes up each said sector group.

13. The optical disc medium of claim 1, wherein the location information of an arbitrary one of the sector groups is distributed to multiple sectors included in the sector group.

14. The optical disc medium of claim 1, wherein the sector located at the top of each said sector group is identical with the sector located at the top of one of the sector blocks on which the logical processing is performed.

15. The optical disc medium of claim 1, wherein the logical processing is error correction processing.

16. The optical disc medium of claim 1, wherein the logical processing is interleaving processing.

17. The optical disc medium of claim 1, wherein replacement processing is performed on a sector group basis.

18. The optical disc medium of claim 1, wherein each said sector has a header field and a recording field that follows the header field, said recording field including a region on which location information of the sector is recorded.

19. An optical disc recorder for performing recording on the optical disc medium as recited in claim 1, wherein each said sector has a header field and a recording field that follows the header field, said recording field including a region on which location information of the sector is recorded.

20. The optical disc medium of claim 1, wherein the optical disc medium has a recording plane that is divided into a plurality of band-like zones, the zones being arranged concentrically around the center of the disc medium, and wherein multiple tracks are included in each said zone, the number of sectors included in each said track changing on a zone-by-zone basis, and wherein in at least one of the zones, the number of sectors that makes up the zone is not a multiple of the number of sectors that makes up each said sector group.

21. The optical disc medium of claim 20, wherein the sectors that make up the zone include a remainder sector that does not belong to any of the sector groups, and wherein the identification mark of the remainder sector is provided with information that makes the sector identifiable as the remainder sector.

22. The optical disc medium of claim 20, wherein no information is recorded on the recording field of the remainder sector.

23. An optical disc recording method for recording information on the optical disc medium of claim 20, wherein the information is not recorded on the recording field of the remainder sector.

24. An optical disc recorder for recording information on the optical disc medium of claim 20, wherein the information is not recorded on the recording field of the remainder sector.

25. The optical disc medium of claim 20, wherein an invalidity signal is recorded on the recording field of the remainder sector to make the sector identifiable as the remainder sector.

26. An optical disc recording method for recording information on the optical disc medium of claim 20, wherein an invalidity signal is recorded on the remainder sector.

27. An optical disc recorder for recording information on the optical disc medium of claim 20, wherein an invalidity signal is recorded on the remainder sector.

28. The optical disc medium of claim 1, wherein the location information that is distributed to the multiple sectors that makes up one of the sector groups is the location information of another one of the sector groups that is located behind the former sector group.

29. An optical disc recording method for performing recording on an optical disc medium comprising a plurality of sector groups, each said sector group being made up of multiple sectors that are contiguous with each other in a circumferential direction on a track, wherein in at least some of the sector groups, location information, representing the location thereof on the optical disc medium, is divided into multiple pieces of information and distributed to associated ones of the sectors on the same track, wherein said associated ones of the sectors constitutes a minimum read/write unit that has its address defined by the location information and the location information is preformatted on the optical discs, wherein replacement processing is performed on a sector group basis and wherein the number of sectors that makes up each said sector group is a multiple of the number of sectors that makes up a sector block on which logical processing is performed.

30. An optical disc recording method for performing recording on an optical disc medium comprising a plurality of sector groups, each said sector group being made up of multiple sectors that are contiguous with each other in a circumferential direction on a track, wherein in at least some of the sector groups, location information, representing the location thereof on the optical disc medium, is divided into multiple pieces of information and distributed to associated ones of the sectors on the same track, wherein said associated ones of the sectors constitutes a minimum read/write unit that has its address defined by the location information and the location information is preformatted on the optical disc, wherein each said sector has a header field and a recording field, said recording field including a region on which location information of the sector is recorded and wherein the number of sectors that makes up each said sector group is a multiple of the number of sectors that makes up a sector block on which logical processing is performed.

* * * * *